United States Patent
Kao

(10) Patent No.: US 10,331,238 B2
(45) Date of Patent: Jun. 25, 2019

(54) MAGNETIC SCALING AND POSITIONING SCROLL WHEEL OF MECHANICAL MOUSE

(71) Applicant: Tsung-Ching Kao, New Taipei (TW)

(72) Inventor: Tsung-Ching Kao, New Taipei (TW)

(*) Notice: Subject to any disclaimer, the term of this patent is extended or adjusted under 35 U.S.C. 154(b) by 0 days.

(21) Appl. No.: 15/413,948

(22) Filed: Jan. 24, 2017

(65) Prior Publication Data
US 2018/0210562 A1  Jul. 26, 2018

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC ............................ G06F 3/0362; G06F 3/03543
See application file for complete search history.

(56) References Cited

U.S. PATENT DOCUMENTS

| | | | |
|---|---|---|---|
| 6,157,369 A * | 12/2000 | Merminod | G06F 3/0312 345/157 |
| 8,040,331 B2 | 10/2011 | Hill et al. | |
| 2007/0188454 A1 * | 8/2007 | O'Sullivan | G06F 3/03543 345/163 |
| 2008/0165128 A1 * | 7/2008 | Cheng | G06F 3/03543 345/163 |
| 2009/0096750 A1 | 4/2009 | Lee | |
| 2017/0262083 A1 * | 9/2017 | Huang | G06F 3/03543 |

* cited by examiner

*Primary Examiner* — David Tung
(74) *Attorney, Agent, or Firm* — Muncy, Geissler, Olds & Lowe, P.C.

(57) ABSTRACT

A magnetic scaling and positioning scroll wheel of a mechanical mouse is revealed. The scroll wheel includes a circular scaling-and-positioning surface with a plurality of magnetic division portions that is rotated with a rotating shaft thereof coaxially and synchronously. A scaling-and-positioning member disposed with at least one scaling-and-positioning portion is corresponding to and magnetically attracted by each magnetic division portion of the circular scaling-and-positioning surface. The scaling-and-positioning portion is released from the previous magnetic division portion and then magnetically attached to the adjacent magnetic division portion in turn continuingly when the circular scaling-and-positioning surface is rotated with the scroll wheel coaxially and synchronously. Thus users can operate the scroll wheel of the mechanical mouse more precisely.

2 Claims, 8 Drawing Sheets

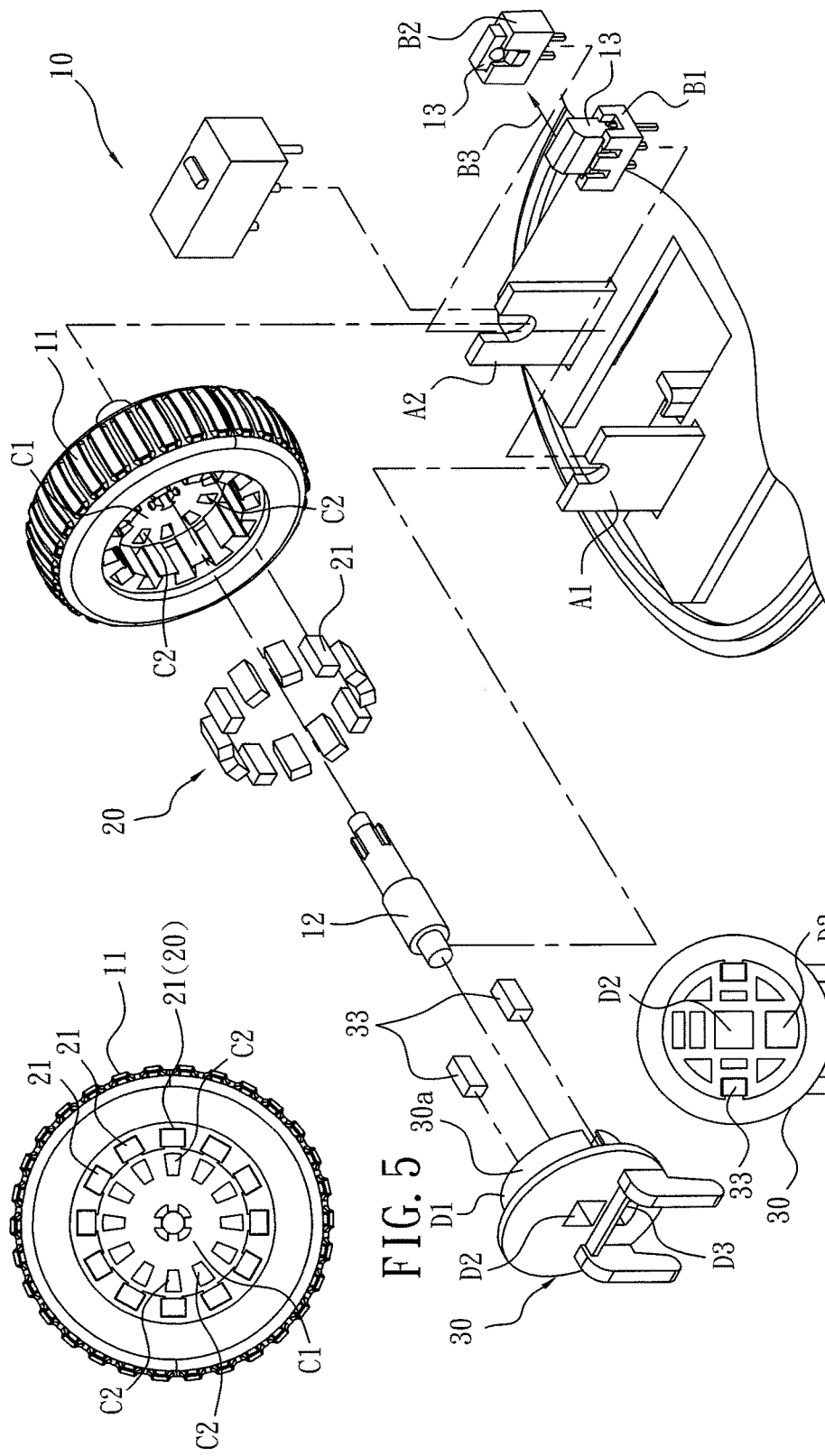

MAGNETIC SCALING AND POSITIONING SCROLL WHEEL OF MECHANICAL MOUSE

BACKGROUND OF THE INVENTION

The present invention relates to a scroll wheel of a mechanical mouse, especially to a magnetic scaling and positioning scroll wheel of a mechanical mouse in which at least one scaling-and-positioning portion arranged at a scaling-and-positioning member and one of a plurality of magnetic division portions disposed on a circular scaling-and-positioning surface are magnetically attracted to each other correspondingly. Thereby users can operate and rotate the scroll wheel more precisely.

A computer mouse provides various basic functions including inputting coordinates, clicking objects, or scrolling horizontally, etc. Refer to FIG. 1 and FIG. 2, take a conventional mechanical/ball mouse 100 as an example. A housing of the ball mouse 100 includes a top cover 101, a bottom cover and a side surface 103. A left button 104, a right button 105 and a projecting middle scroll wheel 106 are arranged at a front side of the top cover 101. According to users' needs, at least one button 107 having other functions and called hot key is disposed on the top cover 101 and/or side surface 103. The left and the right buttons 104, 105, the scroll wheel 106 or the button 107 is a common input device of the ball mouse. As to other electronic or mechanical components of the ball mouse 100, such as mechanical or optical rotary encoder, roller and support of the wheel, circuit board, etc., they are mounted in the housing. The arrangement of the electronic and mechanical components can be achieved by the techniques in the field available now.

While in use, users operate the scroll wheel 106 by their fingers so that a mechanical or optical rotary encoder on a rear end of a rotating shaft of the scroll wheel 106 outputs coded pulse signals generated along with scale divisions of an encoding disk therein when the scroll wheel 106 is rotated. The ball mouse 100 used now, a general/normal rotation mode of the scroll wheel 106 is under control of the scrolling angle or turning angle of the user's finger pressed on the scroll wheel. When the users turn the scroll wheel 106 a certain central angle (or a portion of the circumference), the scroll wheel 106 is rotated the central angle (or a bit larger) synchronously and then stopped when the user's finger stops the operation. In the general/normal rotation mode, a corresponding scroll distance is generated on the screen by the encoding disk of the rotary encoder. This is the common page scroll mode. However, the ball mouse needs other operation mode while being applied to computer games or contests. Not only the operation speed of the mouse should be increased (such as user's fingers can press and activate each key (or hot key) quickly, the precision in rotating the scroll wheel also needs to be improved. For example, the scroll wheel can be scaled and positioned by user's fingers precisely during rotation. Thus the mouse cursor can be positioned for selecting and moving on the screen.

Yet the scaling of the rotation of the scroll wheel of the conventional ball mouse is not obvious for users. Users can't easily intuit the rotation distance of each scale division on the encoding disk of the rotary encoder. The users are unable to operate the scroll wheel precisely and not sure how far they are scrolling. Thus the mouse cursor can't be positioned in time while selecting and moving element on the screen. This causes trouble and inconvenience in computer games or contests while selecting the elements on the screen.

Moreover, there are some prior arts that reveal certain magnetic devices disposed on scroll wheels of the ball mouse such as U.S. Pat. No. 8,040,331 and US Pub. App. No. 2009/0096750A1. Refer to U.S. Pat. No. 8,040,331, a dual-mode rotatable input device revealed includes a biasing mechanism having a magnet and configured to urge the movable interface member into engagement with the resistive surface for control of a rotational velocity of the rotatable member (such as a scroll wheel). Thus the magnet is not used for scaling and positioning of the rotation of the scroll wheel. The complicated design of the structure is not suitable for mass production. Refer to US Pub. App. No. 2009/0096750A1, a scroll wheel device is disclosed. The major characteristic of the present invention lies in the adoption of electromagnetic means to translate the spin of a wheel module into continuous electrical signals. A permanent magnet is incorporated in the wheel module to provide magnetic field. Two sensors tangential to the spinning direction of the permanent magnet are used to detect the variations of the magnetic field from the spin of the wheel module in accordance with the Hall Effect. In this prior art, the magnetic device is also not used for magnetic scaling and positioning of the scroll wheel during rotation.

SUMMARY OF THE INVENTION

Therefore it is a primary object of the present invention to provide a magnetic scaling and positioning scroll wheel of a mechanical mouse in which a circular scaling-and-positioning surface is formed by a plurality of magnetic division portions and rotated along with a rotating shaft of a scroll wheel synchronously. At least one scaling-and-positioning portion of a scaling-and-positioning member is able to be magnetically attached to one of the magnetic division portions of the circular scaling-and-positioning surface correspondingly. The scaling-and-positioning portion is magnetically released from the previous magnetic division portion and then magnetically attached to the next magnetic division portion in turn continuingly when the circular scaling-and-positioning surface is rotated with the scroll wheel coaxially and synchronously. Thereby scaling and positioning of the scroll wheel during rotation are improved and users can operate the scroll wheel of the mechanical mouse more precisely.

In order to achieve the above object, a magnetic scaling and positioning scroll wheel of a mechanical mouse according to the present invention includes a scroll wheel, an encoder module, a circular scaling-and-positioning surface, and a scaling-and-positioning member. The scroll wheel is rotated clockwise and counterclockwise by a rotating shaft. The encoder module is disposed on a rear end of the rotary shaft and used for outputting coded pulse signals generated when the scroll wheel is rotated to drive the encoder module through an encoding disk for scrolling through pages. The circular scaling-and-positioning surface is rotated along with the rotating shaft of the scroll wheel coaxially and synchronously and including a plurality of magnetic division portions. The magnetic division portions are arranged circularly with an equal distance between the two adjacent magnetic division portions and each magnetic division portion is corresponding to a scale division on the encoding disk one-by-one. The scaling-and-positioning member is arranged with at least one scaling-and-positioning portion that is corresponding to and magnetically attached to each magnetic division portion of the scaling-and-positioning surface correspondingly. The scaling-and-positioning portion is magnetically coupled to the magnetic division portion of the scaling-and-positioning surface when the scaling-and-positioning portion of the scaling-and-positioning member is getting close to one of the magnetic division portions of the scaling-and-positioning surface. Once the circular scaling-and-positioning surface is rotated with the scroll wheel synchronously, the scaling-and-positioning portion is magnetically released from the previous magnetic division portion and then magnetically attached to the next magnetic division portion in turn continuingly so as to enhance scaling and positioning of the scroll wheel during rotation. Thus a rotation mode of the scroll wheel with precise scaling and positioning function is provided.

The encoder module 13 includes a mechanical encoder module and an optical encoder module.

The circular scaling-and-positioning surface is disposed on an inner circular edge of the scroll wheel for being rotated along with the scroll wheel synchronously. A plurality of magnetic division portions is arranged circularly with an equal distance between the two adjacent magnetic division portions at the inner circular edge. The scaling-and-positioning member is in the form of an inner wheel mounted in the inner circular edge of the scroll wheel yet not rotated along with the scroll wheel. An outer circular surface of the scaling-and-positioning member is disposed with at least one scaling-and-positioning portion that is corresponding to and magnetically attached to each magnetic division portion on the inner circular edge of the scroll wheel 11 correspondingly.

The circular scaling-and-positioning surface is set on one lateral surface of the scroll wheel.

The circular scaling-and-positioning surface is arranged at a disk of the rotating shaft for being rotated along with the scroll wheel coaxially and synchronously.

An extension portion is disposed on the scaling-and-positioning member and is exposed outside a housing of the mechanical mouse for allowing users to adjust the position of the scaling-and-positioning member relative to the circular scaling-and-positioning surface from outside of the housing.

The position of the scaling-and-positioning member relative to the circular scaling-and-positioning surface can be adjusted so as to make the scaling-and-positioning portion of the scaling-and-positioning member and the magnetic division portion of the circular scaling-and-positioning surface become magnetically coupled to or separated from each other. The scroll wheel is switched to a general rotation mode when the scaling-and-positioning member is moved to make the scaling-and-positioning portion become released from a magnetic coupling range of the magnetic division portion of the circular scaling-and-positioning surface and separated from the magnetic division portion. The scaling-and-positioning portion is magnetically connected to one of the magnetic division portions of the circular scaling-and-positioning surface when the scaling-and-positioning member is adjusted to allow the scaling-and-positioning portion to be magnetically attracted by one of the magnetic division portions of the circular scaling-and-positioning surface. Once the circular scaling-and-positioning surface is rotated with the scroll wheel synchronously, the scaling-and-positioning portion is released from the previous magnetic division portion and then magnetically attached to the next magnetic division portion in turn continuingly. Thereby the rotation of the scroll wheel can be scaled and positioned better. At the moment, the scroll wheel is switched to the rotation mode with precise scaling and positioning function

BRIEF DESCRIPTION OF THE DRAWINGS

FIG. 4 is an explosive view of the embodiment in FIG. 3 according to the present invention;

FIG. 5 is a schematic drawing showing a side view of a roller of the embodiment in FIG. 4 according to the present invention;

FIG. 6 is a schematic drawing showing a side view of a scaling and positioning member of the embodiment in FIG. 4 according to the present invention;

DETAILED DESCRIPTION OF THE PREFERRED EMBODIMENTS

Figure 1:
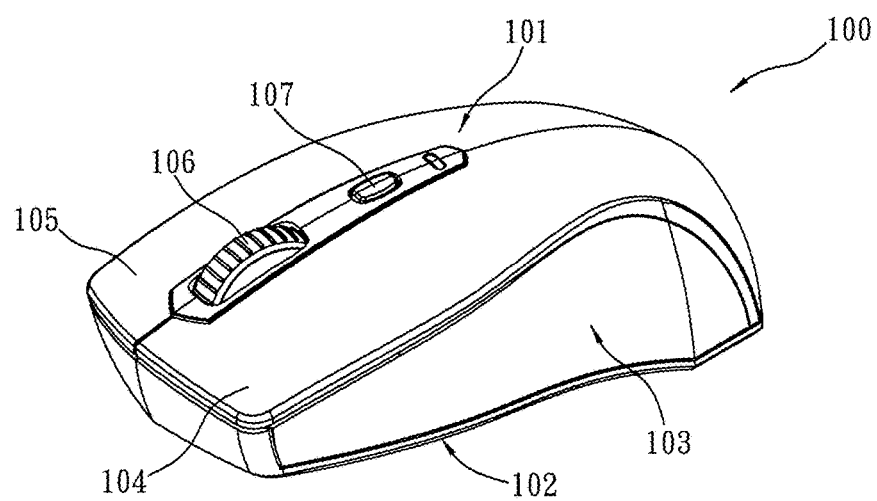
FIG. 1 is a perspective view of a conventional mechanical mouse of a prior art.
Figure 2:
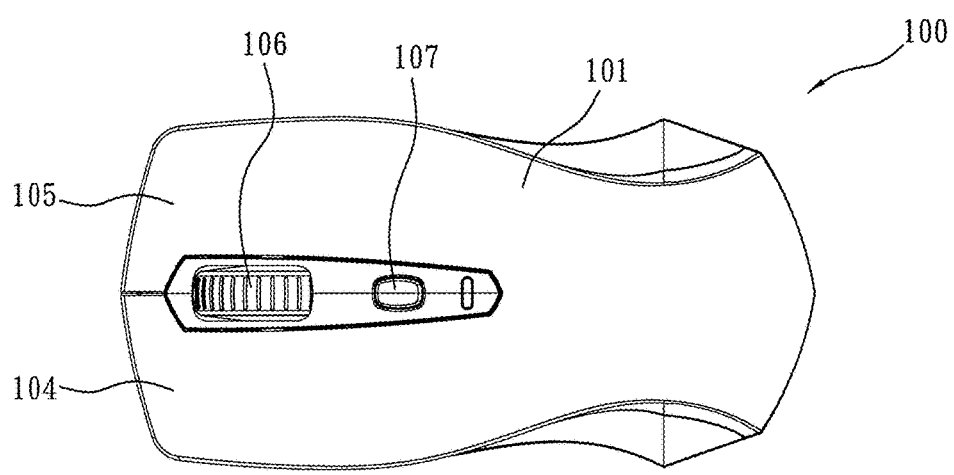
FIG. 2 is a schematic drawing showing a top view of the mechanical mouse shown in FIG. 1.
Figure 3:
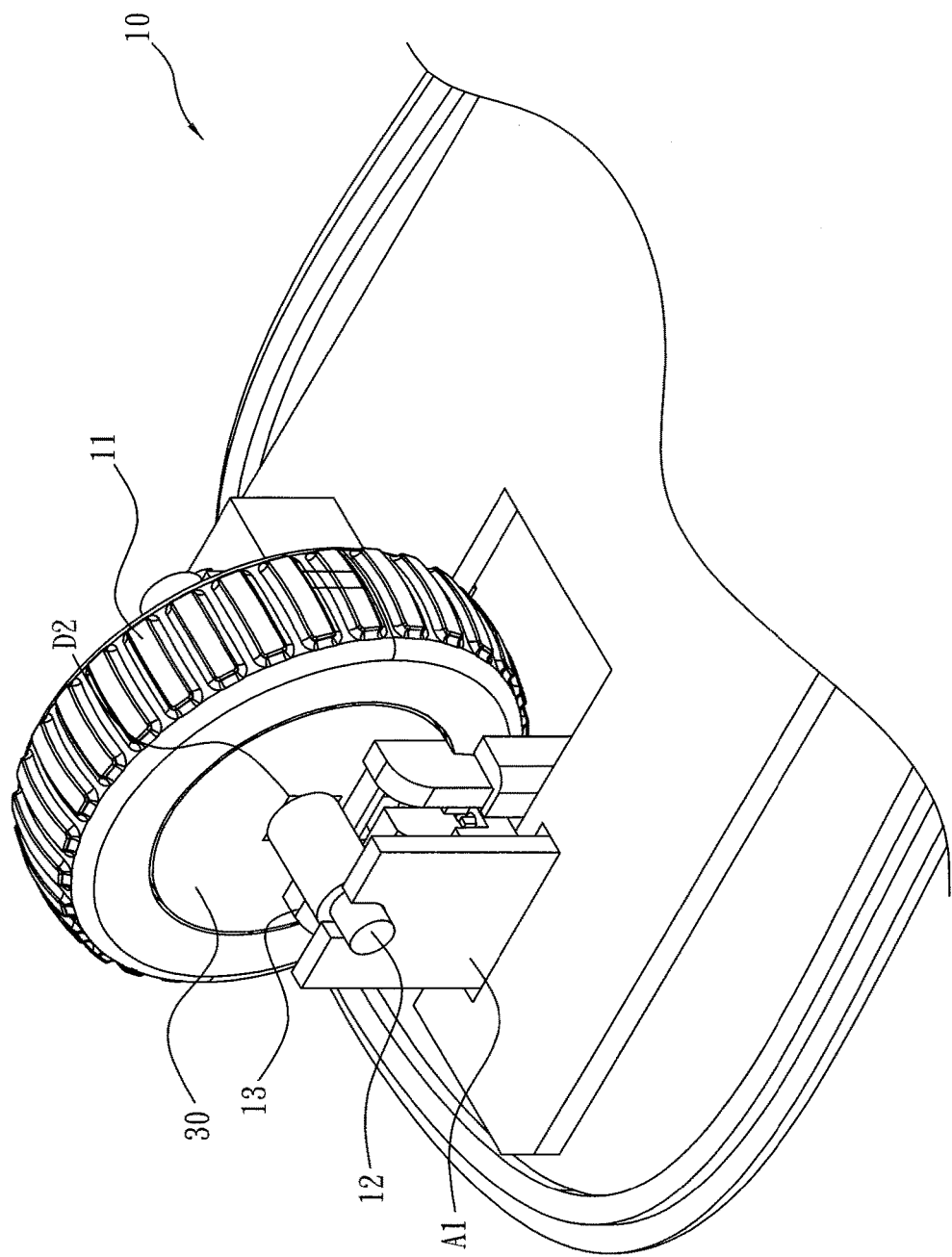
FIG. 3 is a schematic drawing showing a rear view of an embodiment according to the present invention.
Figure 7:
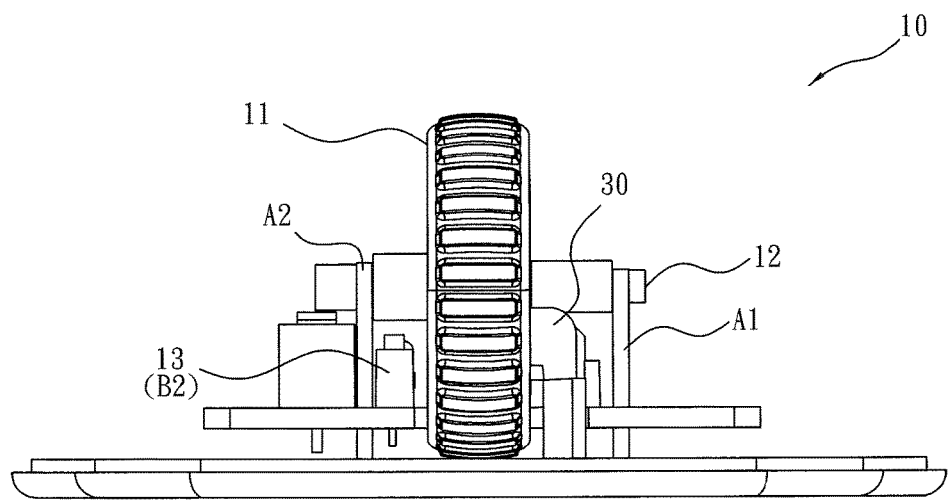
FIG. 7 is a schematic drawing showing a front view of the embodiment in FIG. 3 according to the present invention.
Figure 8:
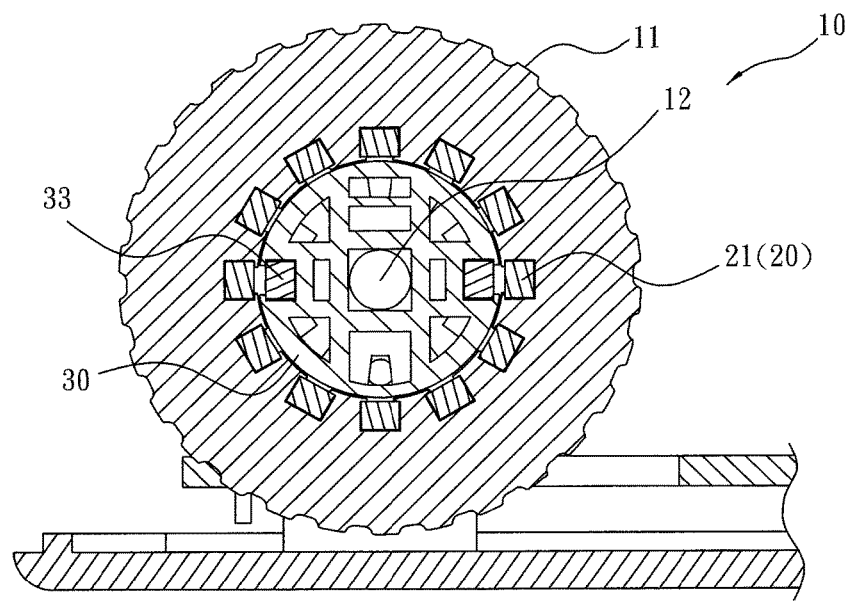
FIG. 8 is a schematic drawing showing a longitudinal sectional view of a roller of the embodiment in FIG. 3 according to the present invention.

The following embodiments are related to components of a mechanical/ball mouse 10. Besides a magnetic scaling and positioning scroll wheel of the present invention, the general mechanical/ball mouse also includes other electrical and mechanical components, such as a rotary encoder 13 in FIG. 3-8, a rotary encoder 13a shown in FIG. 9, FIG. 12, FIG. 15, and FIG. 17, a rotating shaft 12 and a support thereof, a circuit board, a connection wire, or left/right button (as shown in FIG. 1 and FIG. 2). Thus a mechanical mouse 10 of the present invention is not limited to the following embodiments, able to be modified. For example, the appearance of the mechanical mouse 10 formed by a top cover 14 and a bottom cover 15 can be changed. In the mechanical mouse 10, scale divisions of the encoding disk of the encoder module (such as 12 scale divisions or 24 scale divisions), the shape or design of the circuit board, wire or wireless transmission, or the shape or design of the left/right button, is not limited.

Refer from FIG. 3 to FIG. 8, a magnetic scaling and positioning scroll wheel of the present invention is applied to a mechanical mouse 10 and including a scroll wheel (mouse wheel) 11, an encoder module 13, a circular scaling-and-positioning surface 20, and a scaling-and-positioning member 30. The scroll wheel (mouse wheel) 11 is rotated clockwise and counterclockwise by a rotating shaft 12, supported by a left shaft bracket A1 and a right shaft bracket A2. As shown in FIG. 4, the encoder module 13 is formed by an infrared transmitter B1, generating an infrared ray B2 and a corresponding infrared receiver B3, respectively arranged at a left side and right side of the scroll wheel 11 for generating coded pulse signals and scrolling through pages when the scroll wheel 11 is rotated to drive the encoder module 13 through an encoding disk C1. The circular scaling-and-positioning surface 20 is disposed with a plurality of magnetic division portions 21 each of which is corresponding to a scale division C2 on the encoding disk one-by-one. The magnetic division portions 21 are arranged circularly with an equal distance between the two adjacent magnetic division portions 21. The scaling-and-positioning member 30 is arranged with at least one scaling-and-positioning portion 33 corresponding to and magnetically attached to each magnetic division portion 21 of the circular scaling-and-positioning surface 20 correspondingly. The present invention features on that the rotation of the scroll wheel 11 can be scaled and positioned precisely owing to the circular scaling-and-positioning surface 20, the scaling-and-positioning member 30, and magnetic coupling between the scaling-and-positioning portion 33 and the magnetic division portion 21. Thus users can operate the scroll wheel 11 of the mechanical mouse more precisely.

The scroll wheel 11 and the encoder module 13 are used to provide all basic page-scrolling functions of the mechanical mouse 10. The encoder module 13 can be, but not limited to, a mechanical rotary encoder or an optical rotary encoder that outputs coded pulse signals generated while the scroll wheel 11 is rotated to drive the encoder module 13 through the encoding disk (with scales or graduation). The encoder module 13 can also be a mechanical rotary encoder without sales and unable to be rated and positioned while being rotated. There is no scaling-and-positioning member used for control of rotation of the rotating shaft 12 and mounted in the encoder module 13. A circle of the scroll wheel 11 being rotated is divided into a certain number of scales such as 12, 24 or 36. While being rotated by users' finger, the scroll wheel 11 is rotated a certain number of scales and a corresponding coded pulse signal is generated. Thus the rotation of the scroll wheel 11 can be rated and positioned according to the scales and the corresponding coded pulse signal.

Refer from FIG. 3 to FIG. 8, the circular scaling-and-positioning surface 20 is disposed on an inner circular surface of the scroll wheel 11 and is rotated with the rotating shaft 12 of the scroll wheel 11 coaxially and synchronously. The circular scaling-and-positioning surface 20 is composed of a plurality of magnetic division portions 21 arranged circularly with an equal distance between the two adjacent magnetic division portions and each magnetic division portion 21 is corresponding to a scale division on the encoding disk (not shown in figure) of the rotary encoder module 13 one-by-one. The number and the position of the magnetic division portions 21 are the same as and corresponding to scales of the scroll wheel 11 being rotated. Thereby a corresponding coded pulse signal is generated. In this embodiment, there are 12 magnetic division portions 21 arranged at an equal distance circularly. The number of the magnetic division portions 21 is not limited and it can be 24 or 36. The magnetic division portion 21 can be made from permanent magnet.

Still refer from FIG. 3 to FIG. 8, the scaling-and-positioning member 30 is in the form of an inner wheel D1 disposed with an outer circular surface 30a. The inner wheel has a central penetrating hole D2 for receiving an end of the rotating shaft 12 and another penetrating hole D3 for allowing the infrared ray to pass therethrough. The outer circular surface 30a is mounted in the inner circular surface of the scroll wheel 11 arranged with the circular scaling-and-positioning surface 20 yet is not rotated along with the scroll wheel 11. The outer circular surface 30a of the scaling-and-positioning member 30 is disposed with at least one scaling-and-positioning portion 33 that is magnetically attached to one of the magnetic division portions 21 on the inner circular surface of the scroll wheel 11 correspondingly. In this embodiment, there are two scaling-and-positioning portions 33 located at two opposite positions of the diameter of the outer circular surface 30a.

The scaling-and-positioning portions 33 of the scaling-and-positioning member 30 and the magnetic division portions 21 of the circular scaling-and-positioning surface 20 are magnetically coupled to or released from each other correspondingly. In this embodiment, the scaling-and-positioning portion 33 can be made from iron when the magnetic division portion 21 is made from permanent magnet. A magnetic attraction is provided between the iron and the permanent magnet. Or the scaling-and-positioning portion 33 is made from permanent magnet and each magnetic division portion 21 is made from iron.

Moreover, the circuit board of the mouse can be added with other circuit design when the scaling-and-positioning portion 33 is made from electromagnet and the magnetic division portion 21 is made from iron. Under control of the circuit, the scaling-and-positioning portion 33 can become an electromagnet or not. The scroll wheel 11 can be switched to a rotation mode with magnetic scaling and positioning function when the scaling-and-positioning portion 33 becomes the electromagnet. On the other hand, the scroll wheel 11 is switched to a rotation mode without magnetic scaling and positioning function when the scaling-and-positioning portion 33 hasn't become the electromagnet.

While in use, the scaling-and-positioning portion 33 of the scaling-and-positioning member 30 is magnetically coupled to one of the magnetic division portions 21 of the circular scaling-and-positioning surface 20. At the moment, the users rotate the scroll wheel 11 and the circular scaling-and-positioning surface 20 is also rotated with the scroll wheel 11 synchronously. Thus the scaling-and-positioning portion 33 is magnetically released from the previous magnetic division portion 21 and then magnetically attached to the next magnetic division portion 21 in turn continuingly. Thereby the rotation of the scroll wheel 11 is affected by magnetic coupling between the scaling-and-positioning portion 33 and the magnetic division portion 21 and is able to be scaled and positioned magnetically during rotation. Now the scroll wheel 11 is considered as being switched to the rotation mode with magnetic scaling and positioning function.

Figure 9:
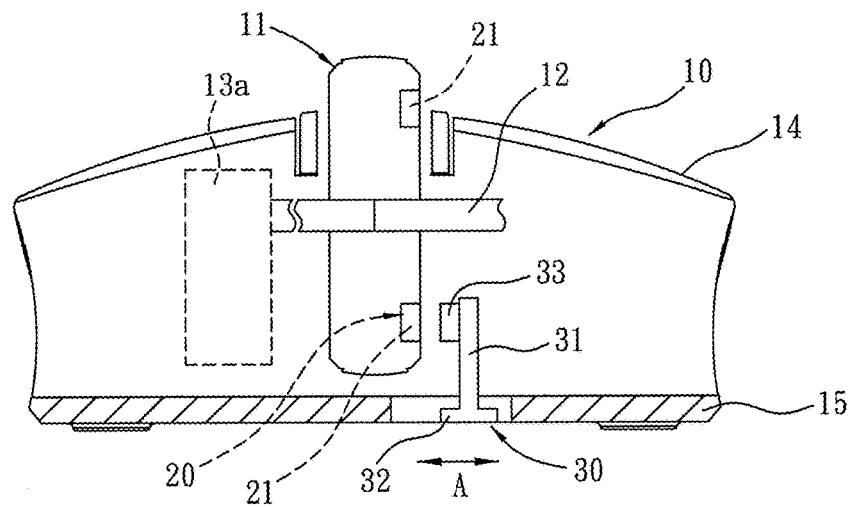
FIG. 9 is a schematic drawing showing a side view of another embodiment according to the present invention.
Figure 10:
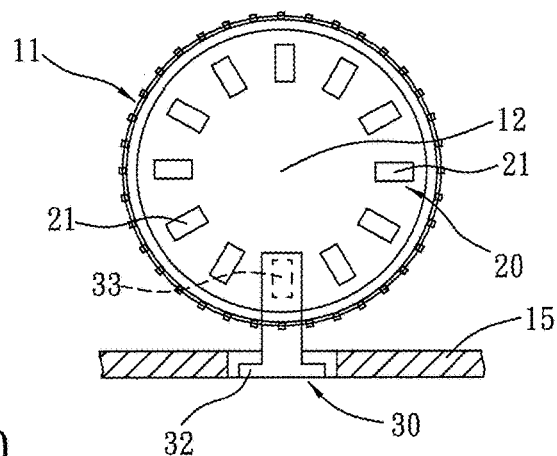
FIG. 10 is a schematic drawing showing a side view of the embodiment in FIG. 9 according to the present invention.
Figure 11:
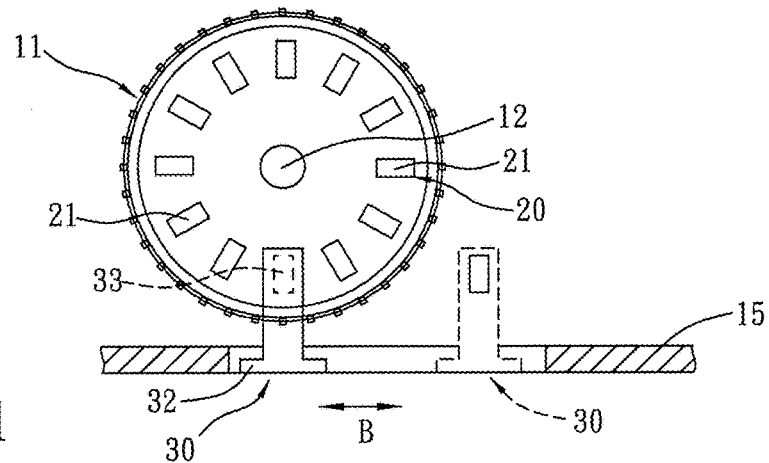
FIG. 11 is a schematic drawing showing an adjustment way of the embodiment in FIG. 10 according to the present invention.

Refer to FIG. 9, FIG. 10, and FIG. 11, another embodiment is revealed. A magnetic scaling and positioning scroll wheel of the present invention is applied to a mechanical mouse 10 and including a scroll wheel (mouse wheel) 11 that is rotated clockwise and counterclockwise by a rotating shaft 12, an encoder module 13a such as a rotary encoder, a circular scaling-and-positioning surface 20, and a scaling-and-positioning member 30. This embodiment features on that the magnetic coupling or magnetic separation between the circular scaling-and-positioning surface 20 and the scaling-and-positioning member 30 can be adjusted by arrangement of the circular scaling-and-positioning surface 20 and the scaling-and-positioning member 30, and the movement of the scaling-and-positioning member 30. Thus the scroll wheel 11 can be switched between a general rotation mode or a rotation mode with magnetic scaling and positioning function.

Still refer to FIG. 9, and FIG. 10, the circular scaling-and-positioning surface 20 is arranged at a lateral surface of the scroll wheel 11 and rotated with the scroll wheel 11 coaxially and synchronously. The circular scaling-and-positioning surface 20 is formed by a plurality of magnetic division portions 21 arranged at an equal distance circularly. The magnetic division portions 21 are corresponding to scales (not shown in figure) on an encoding disk of the encoder module 13 one-by-one. That means the number of the magnetic division portions 21 and the position of each magnetic division portion 21 are the same as and corresponding to the scales of the scroll wheel 11 being rotated respectively. Thereby corresponding coded pulse signals are generated. As shown in FIG. 10, there are twelve magnetic division portions 21 arranged at an equal distance circularly in this embodiment.

Refer to FIG. 9, and FIG. 10, the scaling-and-positioning member 30 is arranged with a scaling-and-positioning portion 33. The scaling-and-positioning portion 33 such as iron part is used in combination with the magnetic division portion 21 such as a permanent magnet, magnetically coupled to or released from each other. In this embodiment, the scaling-and-positioning member 30 further includes a support 31 set on a base 32 and the scaling-and-positioning portion 33 is arranged at the support 31. The scaling-and-positioning member 30 can be moved for adjustment of the position of the scaling-and-positioning member 30 relative to the circular scaling-and-positioning surface 20. Thus the scaling-and-positioning portion 33 can be magnetically coupled to or released from the magnetic division portion 21 of the circular scaling-and-positioning surface 20. As shown in FIG. 9, users can adjust the position of the scaling-and-positioning member 30 from the outside of the mouse 10 by the base 32 exposed outside the bottom cover 15. As the arrow A in FIG. 9 indicates, the scaling-and-positioning portion 33 is magnetically released and separated from one of the magnetic division portions 21 of the circular scaling-and-positioning surface 20 while the base 32 is moved rightward. The scaling-and-positioning portion 33 is magnetically coupled to one of the magnetic division portions 21 of the circular scaling-and-positioning surface 20 while the base 32 is moved leftward. The scaling-and-positioning portion 33 is magnetically released from the previous magnetic division portion 21 and then magnetically attached to the next magnetic division portion 21 in turn continuingly when the circular scaling-and-positioning surface 20 is rotated along with the scroll wheel 11 and the scaling-and-positioning member 30 has been moved to the position that the scaling-and-positioning portion 33 has been magnetically coupled to one of the magnetic division portions 21. Moreover, the adjustment direction of the scaling-and-positioning member 30 is not limited. As the arrow A in FIG. 9 indicates, the direction of the scaling-and-positioning member 30 being moved is parallel to the rotating shaft 12. Refer to the arrow B in FIG. 11, the direction of the scaling-and-positioning member 30 being moved is perpendicular to the rotating shaft 12.

Refer to FIG. 11, while in use, the rotation of the scroll wheel 11 is not affected by magnetic connection of the scaling-and-positioning portion 33 when the scaling-and-positioning member 30 is moved to allow the scaling-and-positioning portion 33 to be released and separated from the magnetic division portion 21 of the circular scaling-and-positioning surface 20. Now the scroll wheel 11 is at a general rotation mode. On the other hand, the user can rotate the scroll wheel 11 and the circular scaling-and-positioning surface 20 is rotated along with the scroll wheel 11 synchronously when the scaling-and-positioning member 30 is adjusted to allow the scaling-and-positioning portion 33 to be magnetically connected to one of the magnetic division portions 21 of the circular scaling-and-positioning surface 20. Thus the scaling-and-positioning portion 33 is released from the previous magnetic division portion 21 and then magnetically attached to the next magnetic division portion 21 in turn continuingly. The rotation of the scroll wheel 11 is affected by magnetic attraction between the scaling-and-positioning portion 33 and the magnetic division portion 21. Thereby the rotation of the scroll wheel 11 can be scaled and positioned better. Now the scroll wheel 11 is at the rotation mode with magnetic scaling and positioning function.

Figure 12:
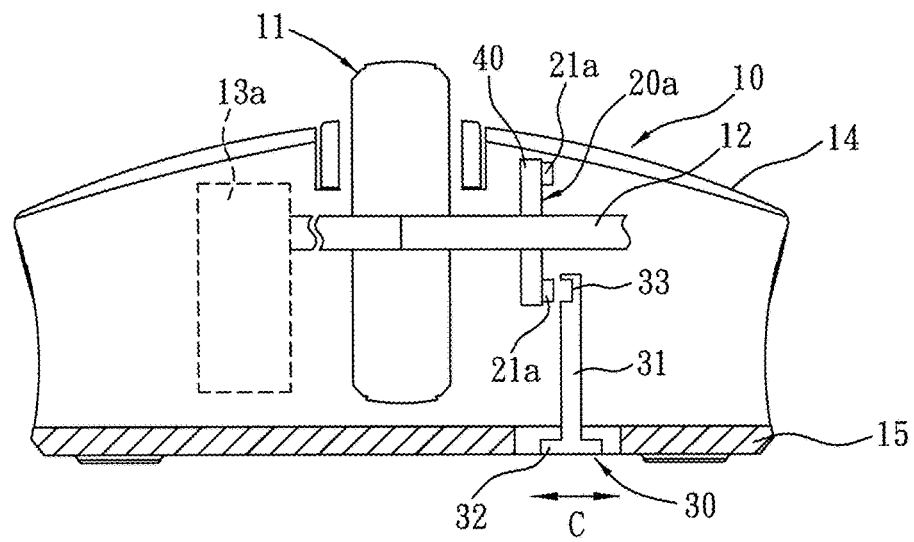
FIG. 12 is a schematic drawing showing a front view of a further embodiment according to the present invention.
Figure 13:
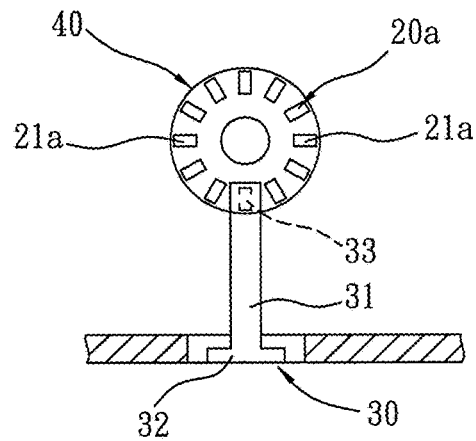
FIG. 13 is a schematic drawing showing a side view of the embodiment in FIG. 12 according to the present invention.
Figure 14:
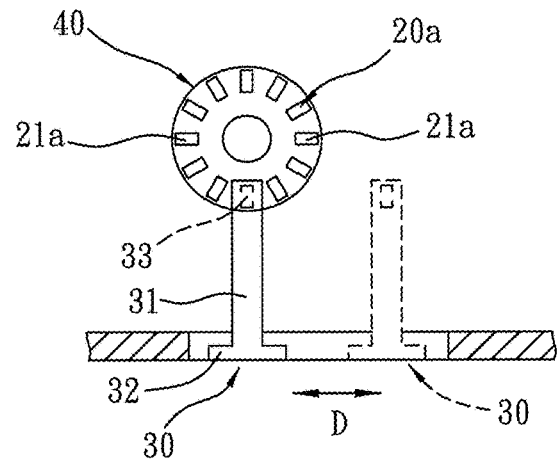
FIG. 14 is a schematic drawing showing an adjustment way of the embodiment in FIG. 12 according to the present invention.

Refer to FIG. 12, FIG. 13 and FIG. 14, a further embodiment is revealed. The difference between this embodiment and the above one in FIG. 9-11 is in that the circular scaling-and-positioning surface 20a and the magnetic division portions 21a of this embodiment are arranged at a disk 40 on the rotating shaft 12 for being rotated along with the scroll wheel 11 synchronously while the circular scaling-and-positioning surface 20 of the above embodiment is disposed on the lateral surface of the scroll wheel 11 for synchronous rotation with the scroll wheel 11. Moreover, users can adjust the position of the scaling-and-positioning member 30 relative to the circular scaling-and-positioning surface 20a from the outside of the mouse 10 by the base 32 exposed outside the bottom cover 15, as the arrow C in FIG. 12 indicates (similar to the arrow A in FIG. 9 indicates), or the arrow D in FIG. 14 indicates ((similar to the arrow B in FIG. 11 indicates).

Figure 15:
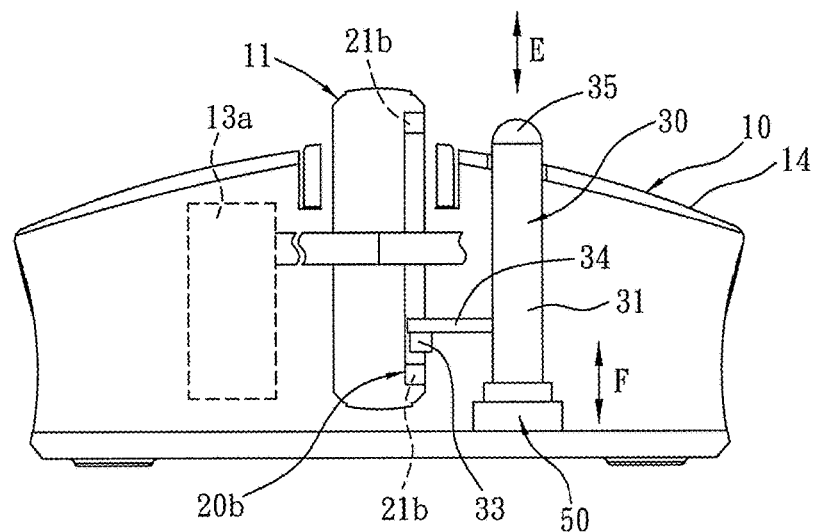
FIG. 15 is a schematic drawing showing a front view of a further embodiment according to the present invention.
Figure 16:
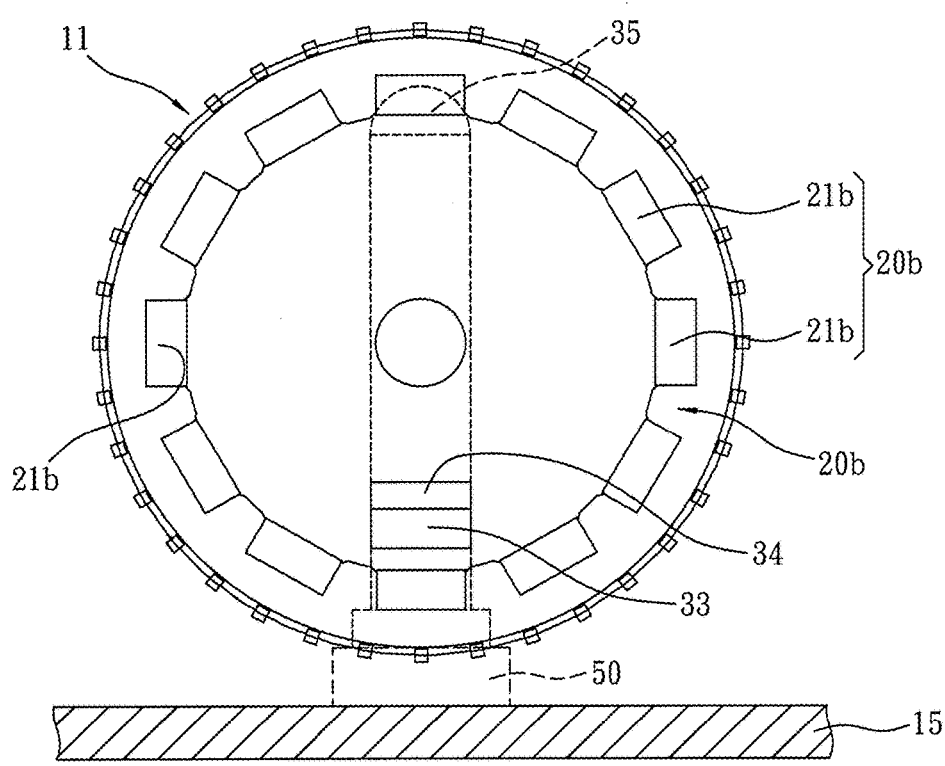
FIG. 16 is a schematic drawing showing a side view of the embodiment in FIG. 15 according to the present invention.

Refer to FIG. 15 and FIG. 16, a further embodiment is revealed. The difference between this embodiment and the second one in FIG. 9-11 is in that the circular scaling-and-positioning surface 20b and the magnetic division portions 21b of this embodiment are arranged at an inner circular edge of the scroll wheel 11 for being rotated along with the scroll wheel 11 synchronously while the circular scaling-and-positioning surface 20 of the second embodiment is disposed on the lateral surface of the scroll wheel 11 for synchronous rotation. As shown in FIG. 15 and FIG. 16, the circular scaling-and-positioning surface 20b and the magnetic division portions 21b are disposed on an inner circular edge of a circular groove on a lateral surface of the scroll wheel 11. Moreover, the scaling-and-positioning member 30 of this embodiment can be set on a push-button that is depressed by one click and returned to un-pushed state by another click (such as a common push button switch). A support rod 34 is used to extend the scaling-and-positioning portion 33 within a magnetic coupling range of the magnetic division portions 21b of the circular scaling-and-positioning surface 20b. An extension portion 35 disposed on top of the scaling-and-positioning member 30 is exposed outside the top cover 14 and used for allowing users to move/adjust the position of the scaling-and-positioning member 30 relative to the circular scaling-and-positioning surface 20b (vertically as the arrow F in FIG. 15 indicates) from the outside of the mouse 10 by pressing the extension portion 35 (as the arrow E in FIG. 15 indicates). The user rotates the scroll wheel 11 and the circular scaling-and-positioning surface 20b is rotated with the scroll wheel 11 synchronously when the scaling-and-positioning member 30 is moved to allow the scaling-and-positioning portion 33 to be magnetically coupled to one of the magnetic division portions 21b of the circular scaling-and-positioning surface 20b. Thus the scaling-and-positioning portion 33 is released from the previous magnetic division portion 21b and then magnetically connected to the next magnetic division portion 21b in turn continuingly. Thereby rotation of the scroll wheel 11 is affected by magnetic force of the scaling-and-positioning portion 33 coupled to the magnetic division portions 21b. Thus the scaling and positioning of the scroll wheel 11 during rotation are improved. Now the scroll wheel 11 is switched to the rotation mode with magnetic scaling and positioning function.

Figure 17:
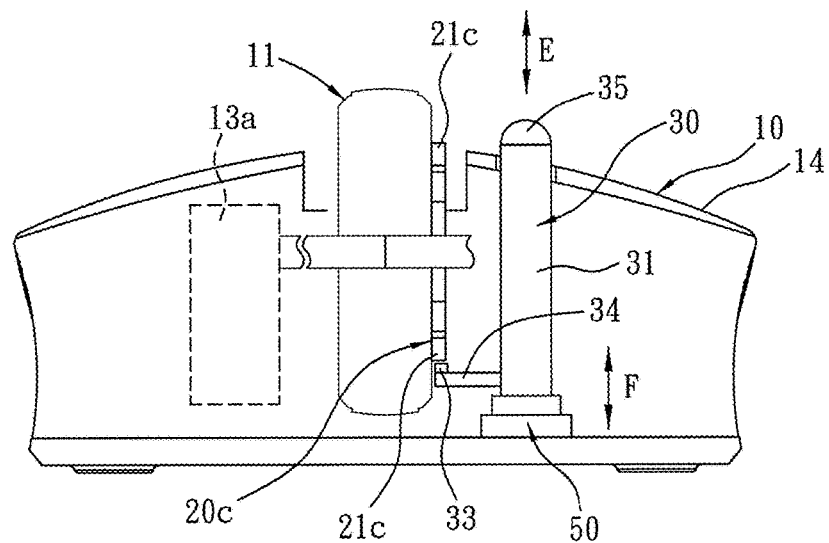
FIG. 17 is a schematic drawing showing a front view of a further embodiment according to the present invention.
Figure 18:
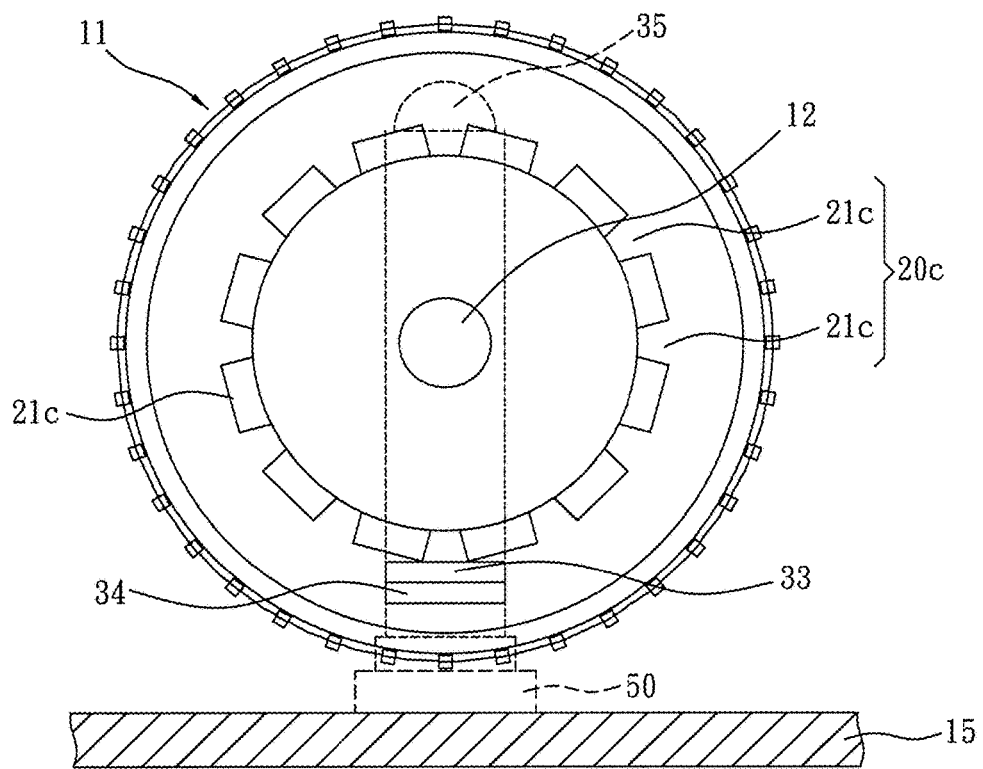
FIG. 18 is a schematic drawing showing a side view of the embodiment in FIG. 17 according to the present invention.

Refer to FIG. 17 and FIG. 18, a further embodiment is revealed. The function of this embodiment is the same as the fourth embodiment shown in FIG. 15 and FIG. 16. The difference between this embodiment and the embodiment shown in FIG. 15 and FIG. 16 is in that the circular scaling-and-positioning surface 20c and the magnetic division portions 21c of this embodiment is disposed on an outer circular edge of a circular projection on a lateral surface of the scroll wheel 11 while the circular scaling-and-positioning surface 20 (20b) of the above embodiment is set on the inner circular edge of the scroll wheel 11 for synchronous rotation along with the scroll wheel 11. Thereby the magnetic scaling and positioning scroll wheel of this embodiment achieves the same function as the above embodiment in FIG. 15 and FIG. 16.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A magnetic scaling and positioning scroll wheel of a mechanical mouse comprising:
   a scroll wheel that is rotated clockwise and counterclockwise by a rotating shaft thereof; wherein the rotating shaft is supported by a left shaft bracket and a right shaft bracket;
   an encoder module that is formed by an infrared transmitter and a corresponding infrared receiver, respectively arranged at a left side and right side of the scroll wheel and respectively arranged between the left shaft bracket and the right shaft bracket for generating coded pulse signals and scrolling through pages when the scroll wheel is rotated to drive the encoder module through an encoding disk; wherein the encoding disk is disposed on the scroll wheel and has a plurality of scale divisions arranged at equal distances circularly on the encoding disk; wherein each of the scale divisions is a penetrating slot for an infrared ray transmitted from the infrared transmitter to pass through and into the corresponding infrared receiver for generating each coded pulse signal;
   a circular scaling-and-positioning surface that is disposed on an inner circular surface of the scroll wheel and is rotated with the rotating shaft of the scroll wheel coaxially and synchronously and having a plurality of division portions arranged at equal distances circularly; each of the division portions corresponds to a scale division on the encoding disk one-by-one so that the number and the position of the respective division portion on the circular scaling-and-positioning surface are equal and corresponding to the scale divisions on the encoding disk of the scroll wheel being rotated respectively for generating the coded pulse signal correspondingly; and
   a scaling-and-positioning member that is arranged between one side of the scroll wheel and the shaft bracket at the corresponding side, the scaling-and-positioning member being in the form of an inner wheel disposed with an outer circular surface; wherein the outer circular surface is mounted in the inner circular surface of the scroll wheel arranged with the circular scaling-and-positioning surface yet is not rotated along with the scroll wheel; wherein the outer circular surface of the scaling-and-positioning member is disposed with at least one scaling-and-positioning portion that is magnetically attached to one of the magnetic division portions on the inner circular surface of the scroll wheel correspondingly; wherein the scaling-and-positioning portions of the scaling-and-positioning member and the magnetic division portions of the circular scaling-and-positioning surface are magnetically coupled to or released from each other correspondingly; wherein the inner wheel of the scaling-and-positioning member has a central penetrating hole for allowing the rotating shaft to pass through and a penetrating hole for allowing the infrared ray transmitted from the infrared transmitter to pass through and into the corresponding infrared receiver;
   wherein the scaling-and-positioning portion of the scaling-and-positioning member and the magnetic division portion on the circular scaling-and-positioning surface are selected from the group consisting of a magnetic body and a magnetically attracted body magnetically coupled to each other; the magnetic body includes a permanent magnet while the magnetically attracted body includes an iron part;
   wherein the scaling-and-positioning portion is magnetically released from the previous division portion and then magnetically coupled to the next division portion in turn continuingly so as to enhance scaling and positioning of the scroll wheel during rotation when the circular scaling-and-positioning surface is rotated with the scroll wheel synchronously; thus a rotation mode of the scroll wheel with precise scaling and positioning function is provided.

2. The device as claimed in claim 1, wherein there are two scaling-and-positioning portions located at two opposite positions of the diameter of the outer circular surface while there are twelve, twenty-four or thirty-six division portions.

* * * * *